Figure 1:
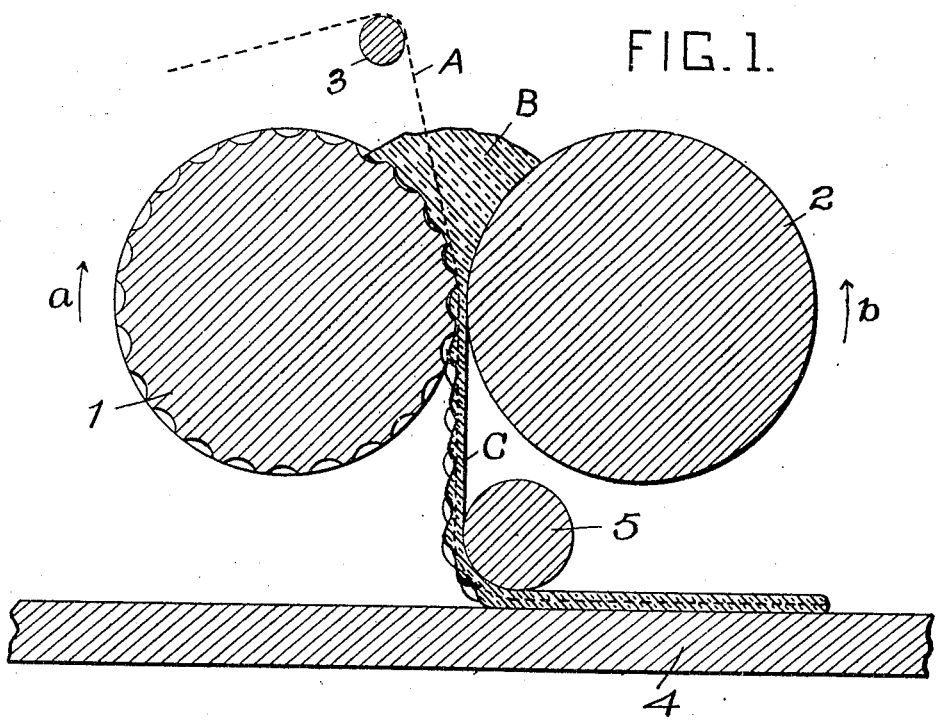

No. 844,587. PATENTED FEB. 19, 1907.
N. FRANZEN.
METHOD OF AND MACHINE FOR MAKING WIRE GLASS.
APPLICATION FILED AUG. 13, 1906.

WITNESSES: INVENTOR
J. Herbert Bradley. Nicklas Franzen
Wm. H. Wilson. by Christy and Christy,
Atty's

UNITED STATES PATENT OFFICE.

NICKLAS FRANZEN, OF WALTON, PENNSYLVANIA, ASSIGNOR TO THE PITTSBURGH PLATE GLASS COMPANY, OF PITTSBURG, PENNSYLVANIA, A CORPORATION OF PENNSYLVANIA.

METHOD OF AND MACHINE FOR MAKING WIRE-GLASS.

No. 844,587.     Specification of Letters Patent.     Patented Feb. 19, 1907.

Application filed August 13, 1906. Serial No. 330,450.

*To all whom it may concern:*

Be it known that I, NICKLAS FRANZEN, a citizen of the United States, residing at Walton, in the county of Allegheny and State of Pennsylvania, have invented or discovered certain new and useful Improvements in Method of and Machine for Making Wire-Glass, of which improvements the following is a specification.

My invention relates to improvements in method of and machines for forming wire-glass; and the object of my improvement is economy in production and superiority of product.

My improvement concerns particularly the formation of wire-glass from a single batch of molten glass introduced into the pass between a pair of forming-rolls.

According to my invention one of the two forming-rolls is pitted—that is, provided with pocket-like cavities or culs-de-sac—over its entire surface, after the manner set forth in Letters Patent No. 823,112, granted me June 12, 1906.

The improved method consists in introducing the wire progressively through the batch of molten glass as the latter is being spread by the forming-rolls and introducing it free from contact with any forming-surface until it passes between the rolls, where it comes into contact with the roll which is pitted. The sheet of glass which is produced by the forming-rolls will then contain the wire embedded in its body, and its surface will bear protuberances of unchilled glass left by the pits in the pitted forming-roll. These excrescences or protuberances are reduced to produce a level and polished surface in any preferred manner, such as by receiving said sheet upon a table and compressing it beneath a roll.

In the accompanying drawings, which form part of this specification, I have shown in alternative form a machine embodying and in operation performing my improvement. The two figures show, diagrammatically, in transverse vertical section my improved machine.

A pair of forming-rolls 1 and 2 are spaced and arranged to form between them a hopper-like receptacle for molten glass, and accordingly they are preferably arranged side by side in horizontal position and parallel one with another. They are rotatable in directions indicated by arrows *a* and *b* to spread to a sheet the batch of molten glass carried between them.

Means are provided for introducing the wire through the receptacle for the glass and into contact with the pitted forming-roll, and such means preferably consist of a positioning-roll 3, arranged above said forming-rolls, over which the wire passes and from which it extends to contact with the pitted roll, the point of contact being preferably in the pass between the rolls, as shown. This wire when introduced into the pass between the rolls, molten glass being teemed between them, will be firmly held, and may, if desired, be subjected to tension.

It will be understood that as the wire advances through the batch of molten glass and into contact with the pitted roll it becomes coated with molten glass, and at the point of contact a thin film of glass lies between the wire and the surface of the roll.

The operation of the parts thus far described will readily be understood. The wire A is carried over positioning-roll 3 and down into the pass between rolls 1 and 2. Molten glass is then teemed into the receptacle, which rolls 1 and 2 form in a batch B. The molten glass passes freely through the wire, which is thus embedded in it. The glass also closes and partly fills the culs-de-sac in the surface of the pitted roll, entrapping in each a small quantity of air, which insulates the glass at these points from chilling contact with the roll-body. The rolls 1 and 2 are then rotated, and the wire being permitted to advance accordingly a sheet of wire-glass C is formed, which descends from between the rolls 1 and 2. This sheet C contains the wire embedded in its body, and its surface bears excrescences of unchilled glass produced by the culs-de-sac in the surface of this pitted roll.

It will be observed of the machine arranged as shown in the drawings that the sheet C, passing from between the forming-rolls 1 and 2, descends to rest upon the table, which is arranged to sustain 1. Such an arrangement has this further advantage: The sheet C has upon one side been chilled by contact with the surface of forming-roll 2; but upon its other side the protrusions already described are uncongealed and soft, and as the sheet C descends this unhardened glass which forms these protuberances will sag downward by gravity into contact with and will coalesce with lower protuberances. This sagging will tend to drag more or less glass through the meshes of the wire and to a greater or less extent to cause the protuberances to coalesce. This is indicated in Figure 1 of the drawings. I further provide means for reducing this uneven surface to level condition, and my preferred means to this end are shown in Fig. 1. A table travels beneath the forming-rolls, and this table advancing as the sheet is being formed, progressively receives and carries the sheet. A roll 5, coöperating with table 4, compresses the sheet and reduces these excrescences to level.

Figure 2:
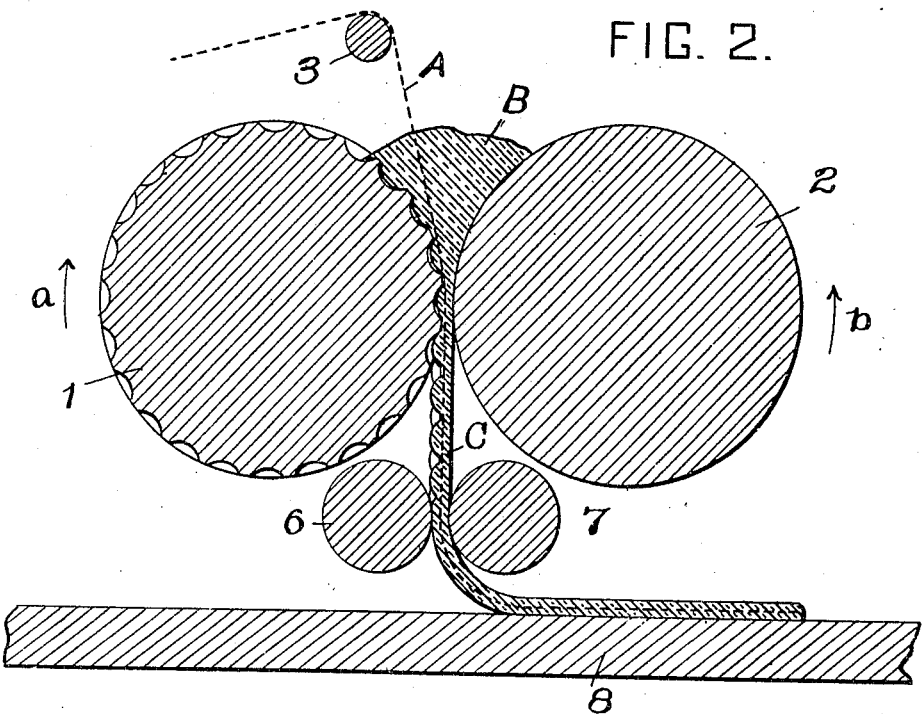

In Fig. 2 I have shown an alternative form,—a pair of rolls 6 and 7, which receive the sheet C into the pass between them and compress it, and reduce the irregular surface to a level condition. In this case also a carrying-table 8 may be provided. It will be understood that by forming these excrescences on the surface of the sheet as it is in process of making and then reducing them in the manner described I obtain a superior surface finish or polish.

In this specification and in the following claims I use the term "wire" without further definition. In making wire-glass in its present commercial form the wire is in the form of a netting. By this term "wire" I mean to designate and to include within the field of my invention not only the familiar netting, but any other material in any form which one may desire to so introduce and embed in a plate of wire-glass.

I claim as my invention—

1. The method of making wire-glass described herein which consists in passing wire through a mass of molten glass, reducing such mass to sheet form having the wire incorporated therein and protrusions of relatively soft and unchilled glass extending from the surface thereof, and reducing to a level the surface of the sheet which bears such protuberances.

2. As a step in the manufacture of plate-glass, the method described herein which consists in reducing a batch of molten glass to the form of a sheet bearing upon its surface protuberances of unchilled glass and sustaining the sheet so spread in a position out of the horizontal while the said protuberances coalesce by the action of gravity.

3. The method of forming wire-glass described herein which consists in introducing the wire through a batch of molten glass, reducing the batch of molten glass to sheet form upon the wire with its surface bearing protuberances or excrescences of soft or unchilled glass, sustaining the sheet so spread in a position out of the horizontal while said protuberances coalesce, and then reducing to a level the said surface of said sheet.

4. In a machine for making wire-glass the combination of a pair of forming-rolls one of which is pitted, disposed and arranged to form a hopper-like receptacle for molten glass and rotating to spread the molten glass so received into sheet form, and means for progressively introducing wire while the molten glass is being spread, through said hopper-like receptacle free from contact with either roll as it passes through the molten batch, and into contact with the pitted roll in the pass between said rolls, substantially as described.

5. In a machine for making wire-glass the combination of a pair of forming-rolls one of which is pitted, disposed and arranged to form a hopper-like receptacle for molten glass and rotating to spread the molten glass so received into sheet form, means for progressively introducing wire while the molten glass is being spread, through said hopper-like receptacle free from contact with either roll as it passes through the molten batch and into contact with the pitted roll in the pass between said rolls, and means for reducing to a level the surface of a sheet so spread by and between said forming-rolls, substantially as described.

6. In a machine for making wire-glass the combination of a pair of forming-rolls one of which is pitted, disposed and arranged to form a hopper-like receptacle wherein molten glass may be teemed and carried by gravity, and from between which a sheet of glass may descend by gravity and rotating to spread the molten glass received by and between them into sheet form, means for progressively introducing the wire while the molten glass is being spread, through said hopper-like receptacle free from contact with either roll as it passes through the molten batch and into contact with the pitted roll in the pass between said rolls, and means for reducing to a level the surface of the sheet spread by and between said forming-rolls, substantially as described.

7. In a machine for making wire-glass the combination of a pair of forming-rolls one of which is pitted, disposed and arranged to form a hopper-like receptacle for molten glass and rotating to spread the molten glass so received into sheet form, means for progressively introducing the wire while the molten glass is being spread, through said hopper-like receptacle free from contact with either roll as it passes through the molten batch and into contact with the pitted roll in the pass between said rolls, a table traveling beneath said forming-rolls and arranged to receive and carry the sheet as it descends from between said forming-rolls, and a finishing-roll coöperating with said table to reduce the surface of the sheet so received and borne by the table to a level, substantially as described.

In testimony whereof I have hereunto set my hand.

NICKLAS FRANZEN.

Witnesses:
 BAYARD H. CHRISTY,
 FRIEDA E. WOLFF.